(No Model.)

2 Sheets—Sheet 1.

A. DAVIDSON.

STEAM SEPARATOR.

No. 10,914.

Reissued Mar. 27, 1888.

WITNESSES:

Fred G. Dieterich

P. B. Turpin

INVENTOR:

Alex. Davidson,

BY Munn & Co.

ATTORNEYS.

N. PETERS, Photo-Lithographer, Washington, D. C.

(No Model.) 2 Sheets—Sheet 2.

A. DAVIDSON.

STEAM SEPARATOR.

No. 10,914. Reissued Mar. 27, 1888.

WITNESSES:
Fred G. Dieterich
P.B. Turpin.

INVENTOR:
Alex. Davidson.
BY Munn & Co
ATTORNEYS.

N. PETERS, Photo-Lithographer, Washington, D.C.

UNITED STATES PATENT OFFICE.

ALEXANDER DAVIDSON, OF CHICAGO, ILLINOIS.

STEAM-SEPARATOR.

SPECIFICATION forming part of Reissued Letters Patent No. 10,914, dated March 27, 1888.

Original No. 377,992, dated February 14, 1888. Application for reissue filed February 29, 1888. Serial No. 265,772.

*To all whom it may concern:*

Be it known that I, ALEXANDER DAVIDSON, a citizen of the United States, residing in Chicago, in the county of Cook and State of Illinois, have invented a new and useful Improvement in Steam-Separators, of which the following is a specification.

My invention is an improved steam-separator; and it consists in certain features of construction and novel combinations of parts, as will be hereinafter described and claimed.

Figure 1:
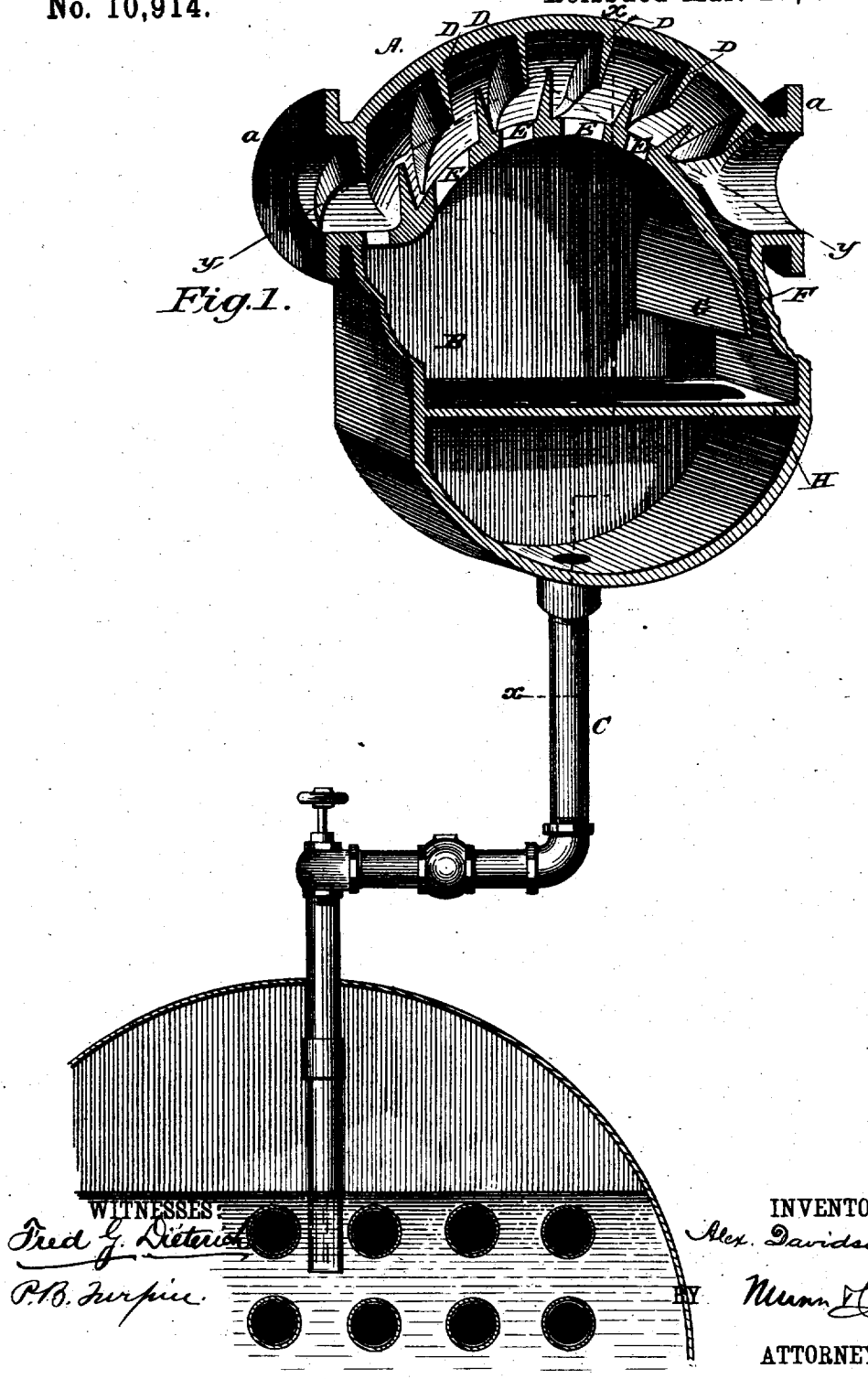
Figure 2:
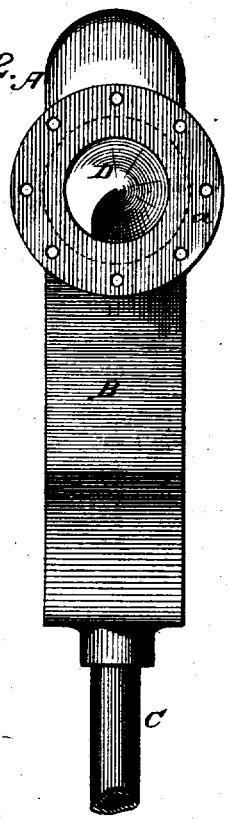
Figure 3:
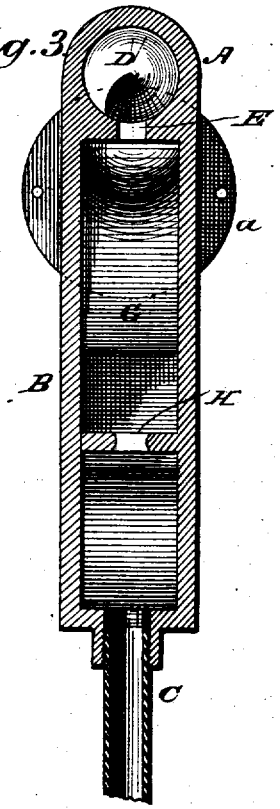
Figure 4:
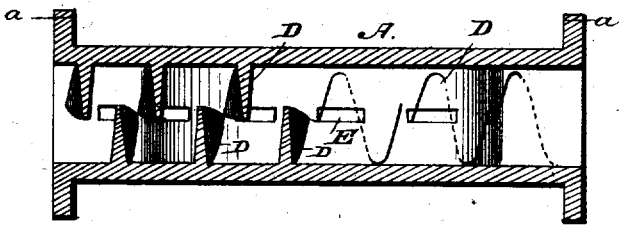

In the drawings, Figure 1 is a perspective sectional view of my improvements in connection with a boiler. Fig. 2 is an end elevation of the purifier or separator. Fig. 3 is a sectional view on about line *x x* of Fig. 1, and Fig. 4 is a section on about line *y y* of Fig. 1.

Impure steam, by reason of its containing too much weight or its being too heavy, has been the cause of imperfect workings and of serious accidents to steam-engines, and the necessity of pure steam for other uses and purposes is apparent.

The present invention has for an object to overcome automatically this difficulty by collecting or trapping such heavy-bodied impurities of steam and returning the same directly to the boiler, to be properly vaporized by placing in or upon the steam-pipe a collector to receive such impurities, and means for checking and depositing the same in the collector. Leading from this collector is a special pipe through the shell or a head of a boiler arranged to discharge into the boiler under the water-line.

My improved devices comprise the steam pipe or section A, the collector B, and the pipe C, discharging from such collector, usually into the boiler, as will be understood.

The steam pipe or section A is usually arranged in or forms a part of the steam-pipe leading from the boiler to the engine, and which steam-pipe may connect with both such parts in any suitable manner. It is preferred to form the pipe or section A with heads *a a*, as shown, to facilitate its application to or insertion in the steam-pipes in use. Manifestly the part A may be round in cross-section, as shown, or be oval, square, or of other desired cross-sectional shape. In the pipe A, I arrange an obstruction or obstructions, which, while they permit the passage of the steam, serve to prevent the free passage thereof, so that the steam will be freed of its impurities, as will more fully appear hereinafter. This obstruction or obstructions preferably is a spiral rib or ribs, D, arranged within the pipe or sections A, as will be more specifically described; and I also form or arrange said pipe or section A out of a straight line, which deflection is preferably effected by forming the pipe or section on a curved line, as shown. This deflection of the pipe or section out of a straight line prevents the steam from blowing directly through the steam pipe or section, and also enables the obstruction or obstructions to act with better results on the steam.

An opening or openings, E, are provided through the bottom wall of the pipe or section A for the passage of the impurities into the collector-chamber. At the rear end of the collector-chamber an opening or passage, F, is provided, leading into the steam-pipe, and in front or in advance of said opening F, I provide a deflector, G, which depends in advance of the opening F and prevents the impurities from being forced out of such opening with the steam which may have passed through the openings E with the impurities. This deflector G is, by preference, an extension of the base-plate of the steam pipe or section A, as clearly shown in Fig. 1. The impurities drop to the bottom of the collector-chamber, and to prevent their being forced or carried thence upward along the walls of such chamber by the force or suction of the steam I provide a stop-flange, H, which projects inwardly from and extends around the walls of the collector-chamber at a suitable distance above the bottom of such chamber, as shown.

The pipe C leads from the collector-chamber directly into the body of the boiler. It may be through the sides or ends thereof.

It is preferred to arrange the spiral ribs D in series, as shown in Figs. 1 and 4, and the ends of each rib of such series extend slightly past the ends of the adjacent ribs, as most clearly shown in Fig. 4. This construction and arrangement of the spiral ribs insures the contact of the steam with each rib of the series, while the break in the ribs where one section follows another causes a greater commotion in the steam and effects a better separation and deposition of the impurities. It will also be seen that the ribs are of greater width at one end or point than at another, this being usually and preferably effected by making each of the ribs of a gradually-increasing width from its front to its rear end, so that the rear end at the bottom of the steam pipe or section will be the highest, and so present obstruction to the heavy impurities, while the purified steam will pass over it and on to the next spiral, as will be understood from Fig. 1.

In the operation of the invention the steam entering at one end of the steam pipe or section, as indicated by arrow, Fig. 1, passes through said section, and in its passage is given a whirling and ringing motion by the spiral rib or ribs with which it comes in contact, the contact with the said ribs and the centrifugal action generated in the whirling or ringing of the steam causing the heavy impurities to be deposited where they will pass through the openings E into the collector-chamber. A portion of the steam will also pass through the said openings with the impurities and will find an exit through opening or passage F, coming in contact with the deflector-plate arranged in advance of such passage, by which the impurities will be checked and fall, while the steam will pass up through such passage into the steam-pipe and on to the engine or other object to which the steam is to be supplied.

It will be understood that the pipe or section may be of any suitable shape or form, as by such term I mean to include any and all steam passages or conduits for steam from a boiler to the engine, machine, or apparatus to which it is desired to supply the steam for any purpose, and, as will be readily understood, the improved device may be conveniently adjusted to any suitable steam-conveyer.

The device is simple in construction, durable, inexpensive, and will be found in practice to result in a large saving of fuel and water, as well as reducing the wear and tear on the engine by supplying the steam thereto in a highly-refined state.

Having thus described my invention, what I claim, and desire to secure by Letters Patent, is—

1. In a steam purifier or separator, a steam pipe or section provided with spiral ribs arranged in series, the ribs or sections of such series following each other, substantially as described, and for the purposes specified.

2. In a steam purifier or separator, a steam pipe or section provided with a series of spirally arranged-ribs, the ends of the adjacent ribs being extended past each other, substantially as set forth.

3. In a steam purifier or separator, a steam pipe or section provided with a series of spirally-arranged ribs following each other, which ribs are made wider at one end or portion than at others, substantially as set forth.

4. In a steam purifier or separator, a steam pipe or section arranged or deflected out of a straight line and having within it a spiral rib or ribs, which spiral rib or ribs are made of an extreme width in excess of the semi-internal diameter of the pipe or section, all being substantially as and for the purposes specified.

5. In a steam purifier or separator, a steam pipe or section arranged or deflected out of a straight line, combined with a spiral rib or ribs therein, substantially as set forth.

6. In a steam purifier or separator, substantially as herein described and shown, a steam pipe or section arranged or deflected out of a straight line and provided with a series of spirally-arranged ribs, the ends of the adjacent ribs being extended past each other, and such ribs being made wider at one end or portion than at others, substantially as set forth.

7. In a steam purifier or separator, a steam pipe or section having within it a spiral rib or ribs made of an extreme width in excess of the semi-internal diameter of the pipe or section, whereby the steam cannot blow straight through said pipe or section, substantially as set forth.

8. In a steam purifier or separator, the combination of a steam pipe or section, an obstruction or obstructions therein, a collector-chamber, an opening or openings being provided leading from the steam-pipe into the collector-chamber, and an opening being provided leading from the collector into the steam pipe or section, and a deflector-plate arranged in advance of the latter opening, substantially as set forth.

9. In a steam purifier or separator, the combination, with the collector-chamber and a steam pipe or section communicating therewith and provided with an obstruction or obstructions to the free passage of the steam, of an inwardly-projected stop-flange extended around the walls of said collector-chamber, substantially as set forth.

10. In a steam purifier or separator, the combination of the steam pipe or section having an obstruction or obstructions to the free passage of the steam and having its under side or plate perforated, and the collector-chamber located below such pipe or section and having at its rear end an opening leading thereinto, the bottom plate of said pipe or section being extended down in advance of the said opening, forming a deflector, substantially as set forth.

11. The improved steam purifier or separator herein described, consisting of the steam pipe or section having an opening or openings in its under side and provided with an obstruction or obstructions to the free passage of the steam, a collector-chamber arranged below the steam pipe or section and having an opening leading into the steam pipe or section, a deflector-plate extended down in advance of said opening, and a stop-flange extended around the wall of said collector-chamber, substantially as set forth.

12. In a steam purifier or separator, a steam pipe or section provided with a spiral rib or ribs secured to the inner side of such pipe or section and projected thereinto a sufficient distance to give a whirling motion to the steam passed through said pipe, as set forth.

Witnesses: ALEXANDER DAVIDSON.
CHAS. F. ZINN,
CYRUS F. SMITH.